May 5, 1959 W. E. GREEN 2,885,027
SEPARATOR-RECEIVER UNIT
Filed July 20, 1956 2 Sheets-Sheet 1

INVENTOR:
WILLARD E. GREEN

BY *Terrell L. Ruhlman*

ATTORNEY

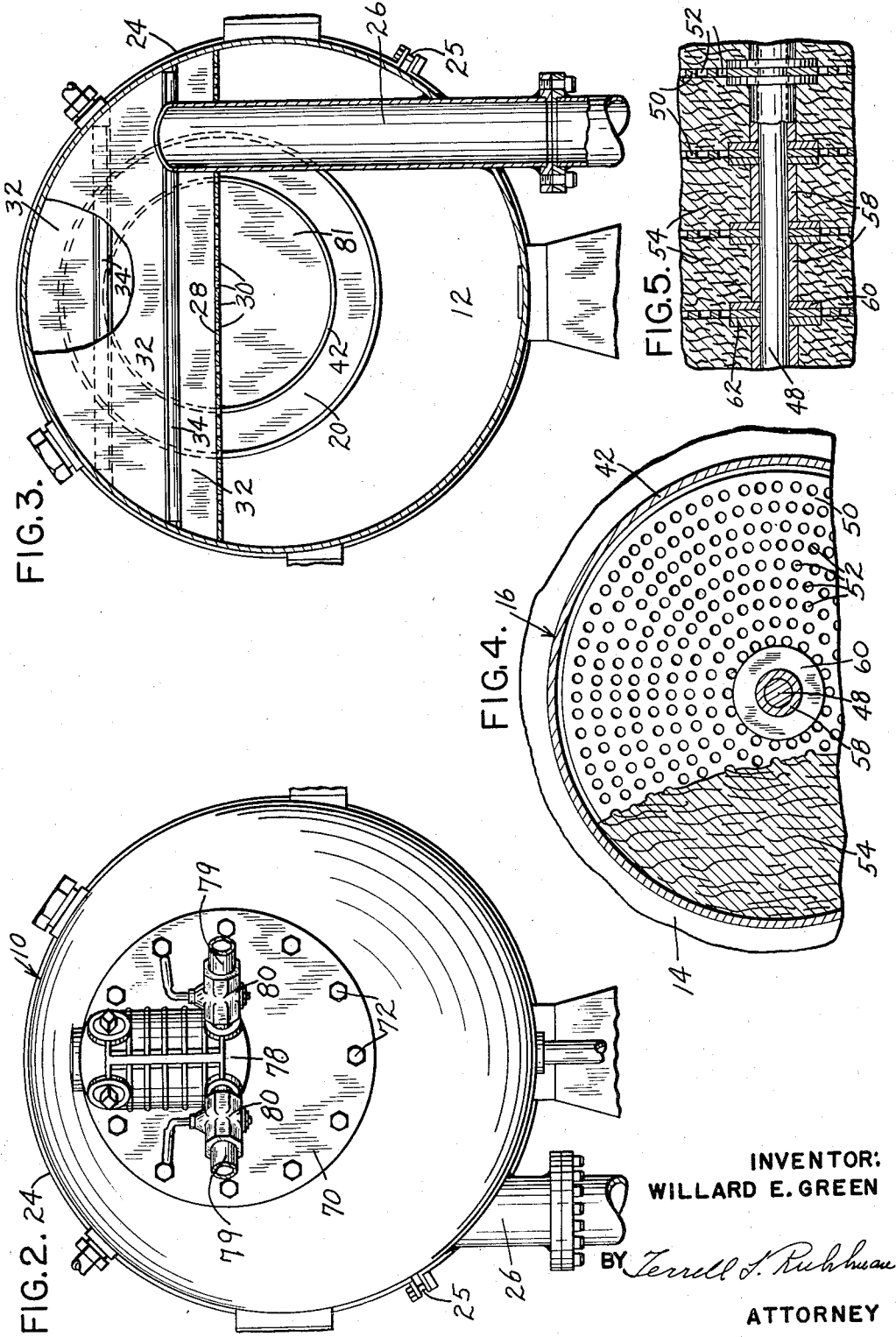

United States Patent Office 2,885,027
Patented May 5, 1959

2,885,027

SEPARATOR-RECEIVER UNIT

Willard E. Green, Michigan City, Ind., assignor to Joy Manufacturing Company, Pittsburgh, Pa., a corporation of Pennsylvania Application July 20, 1956, Serial No. 599,108

6 Claims. (Cl. 183—34)

This invention relates to liquid separator-gas receiver units and especially to a combined oil separator and air receiver unit.

In rotary compressors wherein air is compressed and discharged under presure oil is frequently injected into the air for lubrication purposes as well as for cooling the air. The present invention is particularly applicable for removing such oil from compressed air to thus provide the latter in a cleaner state, for providing storage for such oil, and for providing a reservoir or receiver for the clean air.

Units of this general type wherein means are provided for separating oil from air which flows under pressure from a compressor, and storage space is provided for the air and the separated oil, have heretofore been developed, however certain disadvantages have been apparent in the use of these units. The most noticeable of these disadvantages is the fact that the receiver or air storage portion of the unit was positioned upstream, in terms of air flow, from at least a part of the oil separating means, with the result that when there are sudden demands on the receiver the velocity of the air flowing through the separator portion above mentioned is substantially increased, this increase in velocity being attended by a tendency for the air to pull oil through the separator with it, the discharged air thus being higher in oil content than is many times desirable.

It is therefore a specific object of the invention to provide an oil separator-air receiver unit which not only is compact and highly efficient, but one in which the above disadvantages are minimized, if not wholly obviated.

This and other advantages are realized in a liquid separator-gas receiver unit having a primary liquid separator and liquid storage chamber into which a compressed gaseous stream having liquid entrained therein flows. The inlet for the liquid laden gaseous stream is preferably in the upper portion of this chamber and the stream flows from this point through a series of baffles extending between the upper periphery of the chamber and a longitudinally extending divider plate, wherein a large percentage of the liquid, such as oil, entrained in the gas, such as air, is removed therefrom. The divider plate is perforated to permit the liquid to drain into the storage space below. The gaseous stream after a large percentage of the liquid has been removed flows through a secondary separator or filter which extends between the above chamber and a second chamber or receiver. Substantially all of the liquid remaining in the gas is removed in the secondary filter. The secondary filter is provided with a series of circumferentially spaced openings adjacent its end remote from the first chamber which communicate with the second chamber or receiver. A conduit through which the cleaned gas passes from the unit leads from the discharge end of the secondary separator. The second chamber or receiver thus is also in communication with the discharge conduit through the series of circumferential openings in the secondary separator. When less than the amount of gas flowing into the liquid separator-gas receiver unit is being used, it is apparent that gas after having substantially 100% of the liquid removed therefrom is stored in the receiver with the result that when a sudden demand is placed on the receiver, gas such as air will be drawn from the cleansed gas being stored in the receiver thus minimizing any increase in velocity of gas flowing through the secondary receiver over the increase in velocity that would result were the secondary receiver downstream, in terms of gaseous flow, from the receiver, and thus minimizing the pulling of liquid, so to speak, by the gaseous stream through the secondary separator and out of the unit with the gaseous stream. Other objects and advantages will be apparent from the following more detailed description of the invention when read in conjunction with the attached drawings in which:

Fig. 2 is an end view looking from left to right in Fig. 1;

Fig. 3 is a transverse vertical sectional view taken on the planes of line 3—3 on Fig. 1;

Fig. 4 is a similar view taken on the plane of line 4—4 on Fig. 1, but on an enlarged scale; and Fig. 5 is an enlarged fragmentary sectional view of the secondary separator portion of the present liquid separator-gas receiver.

Figure 1:
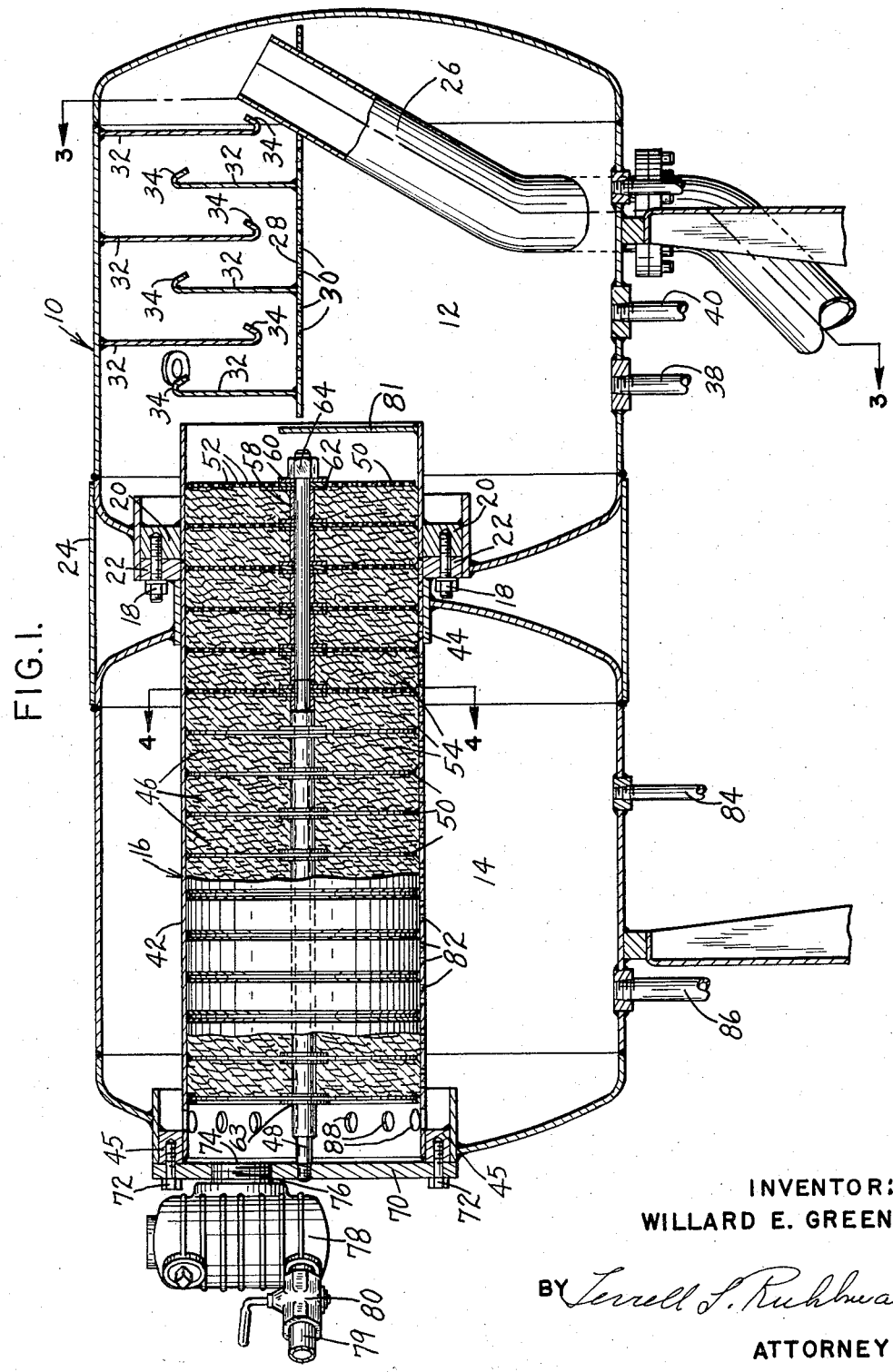
Fig. 1 is a view partly in elevation and partly in longitudinal section of a liquid separator-gas receiver according to the present invention.

Referring now more particularly to the drawings and first to Fig. 1, the unit, designated generally 10, is made up of a chamber 12 which functions as a combined primary liquid separator and liquid storage chamber, as will be more fully developed below, and a chamber 14 which functions as a gas receiver. The chambers are formed with communicating openings through which extends a secondary liquid separator designated generally 16. Chambers 12 and 14 are held in end to end abutting relation by means of threaded elements 18 extending through annular flanges 20 and 22 of the respective chamber housings. A cylindrical plate 24 may be secured by suitable clamp means 25 to the outer walls of the chambers adjacent their engaging flanges to provide in effect a unitary separator-receiver.

A liquid laden gas is conducted into the unit through a suitable conduit 26 which may in a preferred embodiment terminate above the longitudinal center of chamber 12.

Although it will be understood that the present liquid separator-gas receiver could be used for separating any of a number of liquids from one of several gaseous media, it will be described in connection with its application to separating oil from air which may be compressed by a rotary or other suitable compressor. Conduit 26 extends through an opening in a longitudinally and transversely extending divider plate 28 which is positioned preferably at least above the central longitudinal axis of chamber 12. A series of transversely extending and longitudinally spaced baffles 32 are secured alternately to the inner periphery of the wall of chamber 12 and the divider plate 28. Baffles 32 terminate in hooked ends 34 and provide a zigzagged path through which the air must flow from the conduit 26. A large percentage of the oil entrained in the air flowing from conduit 26 is thus removed from the air either gravitationally or by contact with baffles 32. The separated oil drains downwardly through openings 30 in plate 28 and into the lower portion of chamber 12. Suitable conduits 38 and 40 through which the oil can be conducted back to the compressor connect with the bottom of chamber 12.

The partially cleaned air which flows downstream from the last of the baffles 32, i.e. the left most baffle as viewed in Fig. 1, passes next into the secondary separator 16. The generally cylindrical casing 42 of the secondary separator is supported at its upstream end by the annular flanges 20 and 22 and a further annular portion 44 of the housing of chamber 14, and at its downstream end by an annular flange 45 on the latter chamber housing. Separator casing 42 is desirably secured against longitudinal displacement by welding it to flange 45. In a preferred embodiment the secondary separator comprises a series of filtering compartments 46, with an elongated rod 48 passing through their central axes. The compartments 46 are formed by plates 50 which are perforated to provide a plurality of openings 52 therethrough, see Fig. 4, with wool or like material 54 placed between successive ones of the perforated plates 50. Plates 50 are desirably mounted on a rod on which they are separated by thimbles 58, 60 and 62 and a collar 63 at the left end. (See Figs. 1 and 5.) The herein interchangeable filter of the secondary separator thus quickly can be removed from casing 42, and a new filter placed in position within the casing. A suitable lock nut 64 is secured to rod 48 adjacent the furthest upstream plate 50, i.e. the last plate to the right as viewed in Fig. 1, while the downstream end of rod 48 is secured to a backing plate 70 which is in turn secured by threaded elements 72 to the annular flange 45. A suitable outlet opening 74 is formed in plate 70 with a conduit 76 fitted therein in communication with the secondary separator and a valve chamber 78. Suitable stop valves 80 communicate with chamber 78 to control the flow of cleaned air as through work lines 79 to the ultimate point of use. It will also be noted that there is a generally semi-circular plate 81 at the upstream end of casing 42 to thus restrict the flow into that portion of the casing which lies above divider plate 28.

The flow of air through the secondary separator results in removal of substantially all of the oil remaining in the air after its passage through the primary separating unit. Casing 42 is perforated at least at its lower periphery to provide openings 82 through which the oil removed therein can flow into chamber 14. It will be appreciated that a relatively small amount of oil remains to be removed by the secondary separator and that the upstream compartments of the separator remove the bulk of the remaining oil, i.e. the successive ones of the compartments 46 of secondary separator 16 looking from right to left in Fig. 1 remove progressively less oil from the air. The small amount of oil which drains from the secondary separator into chamber 14 can flow out through suitable conduits 84 and 86 in the bottom of the chamber and be directed back to the compressor.

Casing 42 of the secondary seeparator is also provided with a plurality of circumferentially spaced openings 88 adjacent its downstream end through which cleansed air can flow into chamber 14, and when all of the air which flows into unit 10 is not being utilized, i.e. flowing out of the unit through valves 80, chamber 14 serves as an air receiver or storage chamber. It will be appreciated that with the receiver discharging directly to the line of supply to an ultimate point of use, when there is a sudden demand on the receiver, the air will be taken directly from receiver 14 through the openings 88 and 74, and out through the chamber 78 and valves 80, with a result that there is no appreciable increase in the velocity of the air flowing through secondary separator 16. It is apparent therefore that with the increase in velocity through the casing 42 minimized there is no tendency for oil to be carried therethrough and be entrained in the air as it flows out of the unit. The separator receiver of the present invention thus is much more efficient under conditions of varying demands than those wherein the receiver is upstream in terms of air flow from at least a part of the oil separating apparatus and wherein sudden demands on the receiver effect a substantial increase in velocity of the air flowing through that portion of the oil separating apparatus downstream of the air receiver and a pulling of oil through the separator and out of the unit with the air stream.

From the foregoing it can be seen that I have provided a combined liquid separator and gas receiver which is compact in nature and which is highly efficient under varying operating conditions. It will also be appreciated that while there is shown and described in this application one form which the invention may assume in practice, this form is shown for purposes of illustration only and that the invention may be modified and embodied in various other forms without departing from its spirit or the scope of the appended claims.

What I claim is:

1. A liquid separator-gas receiver unit comprising, a storage chamber having an elongated hollow casing extending therethrough to define a gas flow path, liquid separating filter means disposed axially of and across said casing with the downstream end thereof being spaced inwardly from the downstream end of said casing, and at least one passageway means extending from internally of a portion of said casing downstream of said filter means to internally of said storage chamber to connect said casing portion to said storage chamber and permit gas flow therebetween.

2. A liquid separator-gas receiver unit comprising, a storage chamber having an elongated hollow casing extending therethrough to define a gas flow path, liquid separating filter means disposed axially of and across said casing with the downstream end thereof being spaced inwardly from the downstream end of said casing and located within said storage chamber to form a hollow portion of said casing between the downstream end of said filter means and the inner surface of said storage chamber facing said downstream end of said filter means, and a plurality of passageways extending through the side of said hollow portion of said casing whereby gas flow may occur between said storage chamber and said hollow portion of said chamber.

3. A liquid separator-gas receiver unit comprising, a storage chamber having an elongated hollow casing extending therethrough to define a gas flow path, a head means for closing the downstream end of said casing, liquid separating filter means disposed axially of and across said casing with the downstream end thereof being spaced inwardly from said head means to form a hollow portion of said casing between the downstream end of said filter means and the inner surface of said head, at least one passageway connecting said hollow portion of said casing to said storage chamber to permit gas flow therebetween, and an outlet opening in said head means.

4. A liquid separator-gas receiver unit comprising, a storage chamber having an elongated hollow casing extending therethrough to define a gas flow path, liquid separating filter means disposed axially of and across said casing with the downstream end thereof being spaced inwardly from the downstream end of said casing, at least one passageway extending through the portion of said casing between the downstream end of said casing and the downstream end of said filter means to connect said casing portion to said storage chamber to permit gas flow therebetween, and said passageway having a cross sectional area and said storage chamber having a volume to provide for increased gas flow through the downstream end of said casing under sudden demand conditions without causing any substantial increase in the velocity of the gas normally flowing through said filter means.

5. A liquid separator-gas receiver unit comprising, a storage chamber having an elongated hollow casing extending therethrough to define a gas flow path, liquid separating filter means disposed axially of and across said casing with the downstream end thereof being spaced inwardly from the downstream end of said casing and located within said storage chamber to obtain a hollow portion of said casing between the downstream end of said filter means and the inner surface of said storage chamber facing said downstream end of said filter means, a plurality of passageways extending through the side of said hollow portion of said casing to permit gas flow between said storage chamber and said hollow portion of said casing, and said passageways having a cross sectional area and said storage chamber having a volume to provide for increased gas flow through the downstream end of said casing under sudden demand conditions without causing any substantial increase in the velocity of the gas normally flowing through said filter means.

6. A liquid separator-gas receiver unit comprising, a first chamber means for conducting a stream of liquid laden gas under pressure into said chamber, primary separating means in said first chamber for removing a part of said liquid from said gas, a second chamber separate from said first chamber, an elongated hollow casing extending from said first chamber through said second chamber to define a gas flow path, liquid separating filter means disposed axially of and across said casing with the downstream end thereof being spaced inwardly from the downstream end of said casing, and at least one passageway means extending from internally of a portion of said casing downstream of said filter means to internally of said storage chamber to connect said casing portion to said second chamber to permit gas flow therethrough.

References Cited in the file of this patent

UNITED STATES PATENTS

| | | |
|---|---|---|
| 885,185 | Serrell | Apr. 21, 1908 |
| 933,926 | Seeley | Sept. 14, 1909 |
| 1,323,048 | Goodwin | Nov. 25, 1919 |
| 1,869,371 | Fowler | Aug. 2, 1932 |
| 2,521,785 | Goodloe | Sept. 12, 1950 |
| 2,610,697 | Lovelady et al. | Sept. 16, 1952 |
| 2,642,954 | Le Valley | June 23, 1953 |
| 2,656,896 | Glasgow | Oct. 27, 1953 |
| 2,737,261 | Duncan et al. | Mar. 6, 1956 |
| 2,812,034 | McKelvey | Nov. 5, 1957 |

FOREIGN PATENTS

| | | |
|---|---|---|
| 3,993 | Austria | Apr. 25, 1901 |
| 27,058 | Great Britain | Nov. 22, 1909 |
| 152,274 | Sweden | Aug. 25, 1955 |